United States Patent
Yuksel et al.

(10) Patent No.: US 12,410,038 B1
(45) Date of Patent: Sep. 9, 2025

(54) DYNAMIC COMB FOR CONVEYANCE SYSTEMS FOR MOVING PEOPLE OR OBJECTS

(71) Applicant: Beltways Inc., Cincinnati, OH (US)

(72) Inventors: Matine Yuksel, Cincinnati, OH (US); Yahya John Yuksel, Cincinnati, OH (US); Edip Yuksel, Cincinnati, OH (US)

(73) Assignee: Beltways Inc., Cincinnati, OH (US)

( * ) Notice: Subject to any disclaimer, the term of this patent is extended or adjusted under 35 U.S.C. 154(b) by 0 days.

(21) Appl. No.: 19/071,500

(22) Filed: Mar. 5, 2025

Related U.S. Application Data

(60) Provisional application No. 63/561,835, filed on Mar. 6, 2024.

(51) Int. Cl.
*B66B 29/06* (2006.01)
*B65G 47/66* (2006.01)

(52) U.S. Cl.
CPC ............. *B66B 29/06* (2013.01); *B65G 47/66* (2013.01)

(58) Field of Classification Search
CPC ................................. B66B 29/06; B65G 47/66
USPC .......................................................... 198/325
See application file for complete search history.

(56) References Cited

U.S. PATENT DOCUMENTS

| | | | | |
|---|---|---|---|---|
| 5,215,182 A | * | 6/1993 | Garbagnati | C08F 10/00 198/600 |
| 5,971,129 A | * | 10/1999 | Stawniak | B66B 29/08 198/324 |
| 6,068,107 A | * | 5/2000 | Brun-Jarret | B66B 1/12 198/324 |
| 6,164,435 A | * | 12/2000 | Coen | B65G 47/66 198/600 |
| 6,644,457 B2 | * | 11/2003 | Lauch | B66B 29/06 198/324 |
| 6,978,875 B2 | * | 12/2005 | Diaz | B66B 29/08 198/325 |
| 8,365,899 B2 | * | 2/2013 | McKee | B65G 47/66 198/600 |
| 11,772,896 B2 | * | 10/2023 | van Schalkwijk | B65G 47/66 198/841 |
| 2015/0291368 A1 | * | 10/2015 | Pettinga | B65G 47/66 198/600 |
| 2024/0034570 A1 | * | 2/2024 | Berenbach | B65G 47/66 |

FOREIGN PATENT DOCUMENTS

| | | | | |
|---|---|---|---|---|
| KR | 2019001212 A | * | 1/2019 | ............ B66B 23/12 |
| WO | WO-2004069726 A1 | * | 8/2004 | ............ B66B 29/06 |

OTHER PUBLICATIONS

Abstract Translation (Year: 2019).*

* cited by examiner

*Primary Examiner* — Mark A Deuble
(74) *Attorney, Agent, or Firm* — Hall Estill Law Firm

(57) ABSTRACT

A dynamic comb for use with a conveyance system to transition a passenger or object from a nonmoving element to a moving element and vice versa. The dynamic comb can include a upper support element or a lower support element. The dynamic comb can also include a roller element disposed at least partially between and below portions of the upper support element. A method of installing the dynamic comb for an existing conveyance system or as part of a new conveyance system to transition a passenger or object from a nonmoving element to a nonmoving element and vice versa.

21 Claims, 6 Drawing Sheets

DYNAMIC COMB FOR CONVEYANCE SYSTEMS FOR MOVING PEOPLE OR OBJECTS

CROSS-REFERENCE TO RELATED APPLICATIONS

The present application is a conversion of U.S. Provisional application having U.S. Ser. No. 63/561,835, filed Mar. 6, 2024, which claims the benefit under 35 U.S.C. 119(e). The disclosure of which is hereby expressly incorporated herein by reference.

STATEMENT REGARDING FEDERALLY SPONSORED RESEARCH OR DEVELOPMENT

Not applicable.

BACKGROUND OF THE DISCLOSURE

1. Field of the Invention

The present disclosure relates to a dynamic comb for use with a conveyance system to prevent the entrapment of objects between moving and nonmoving elements of people or objects.

2. Description of the Related Art

Typical conveyance systems, such as moving walkways and escalators, include a static comb positioned between nonmoving elements and moving elements. The static combs create pinch points where objects can be caught. When objects are caught at these pinch points there can be damage to the conveyance system and/or injuries to people or damage to objects. Either one can cause the conveyance system to be shut down and not operational. There is also a height change between the moving elements of the conveyance system and the nonmoving elements of the conveyance system. This height change, combined with the static nature of the static comb, can also cause other problems for people or objects trying to use the conveyance system.

Accordingly, there is a need for a dynamic comb that can prevent entrapment of objects between moving and nonmoving elements of a conveyance system and allow for easier transition between the moving and nonmoving elements of the conveyance system.

SUMMARY OF THE DISCLOSURE

The present disclosure is directed to a dynamic comb for use with a conveyance system to transition a passenger or object from a nonmoving element to a moving element and vice versa. The dynamic comb can include a upper support element or a lower support element. The dynamic comb can also include a roller element disposed at least partially between and below portions of the upper support element.

The present disclosure is directed to a method of installing the dynamic comb for an existing conveyance system or as part of a new conveyance system to transition a passenger or object from a nonmoving element to a nonmoving element and vice versa.

DETAILED DESCRIPTION OF THE DISCLOSURE

Figure 1:
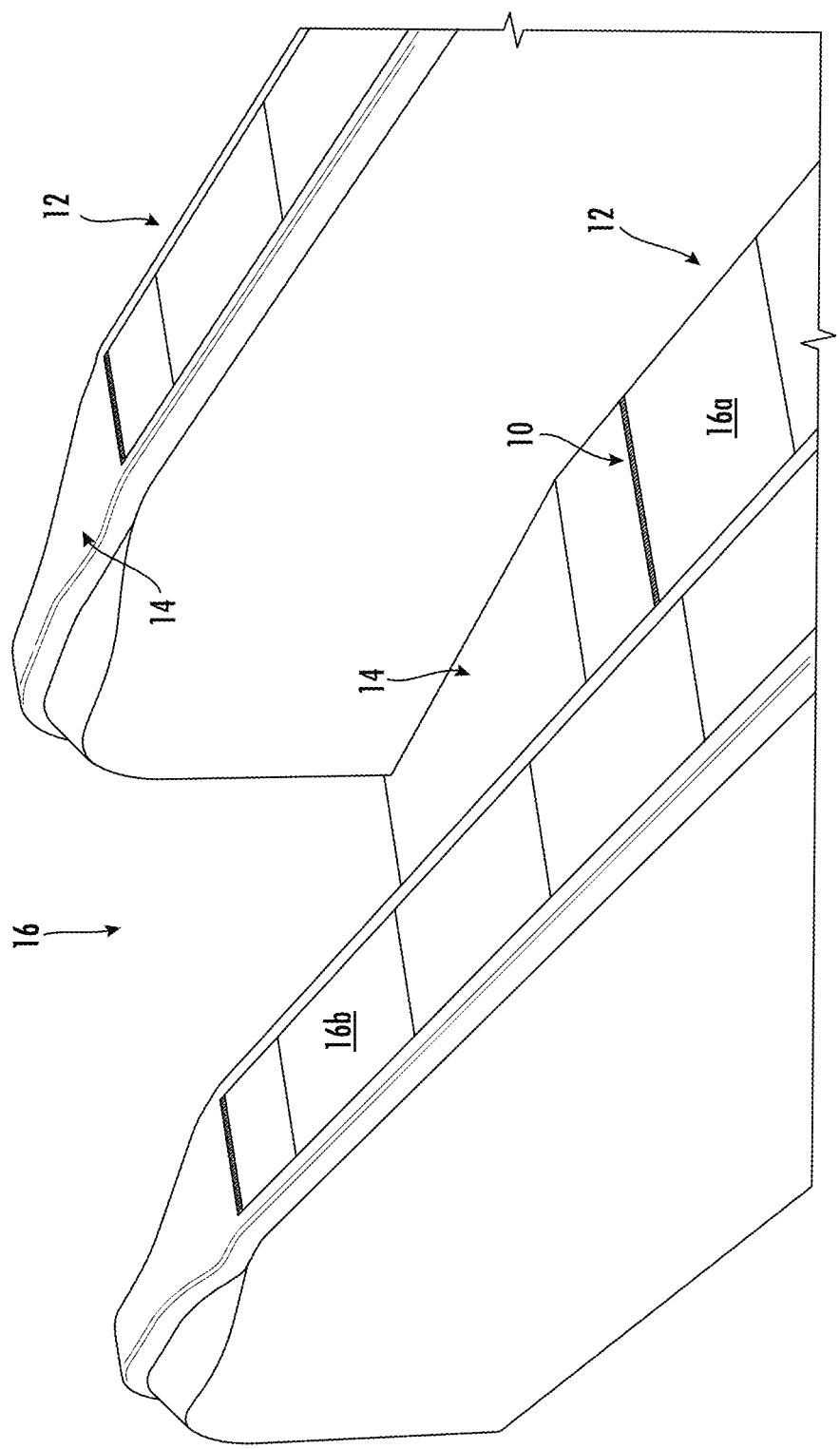
FIG. 1 is a perspective view of one type of conveyance system using a dynamic comb constructed in accordance with the present disclosure.
Figure 2:
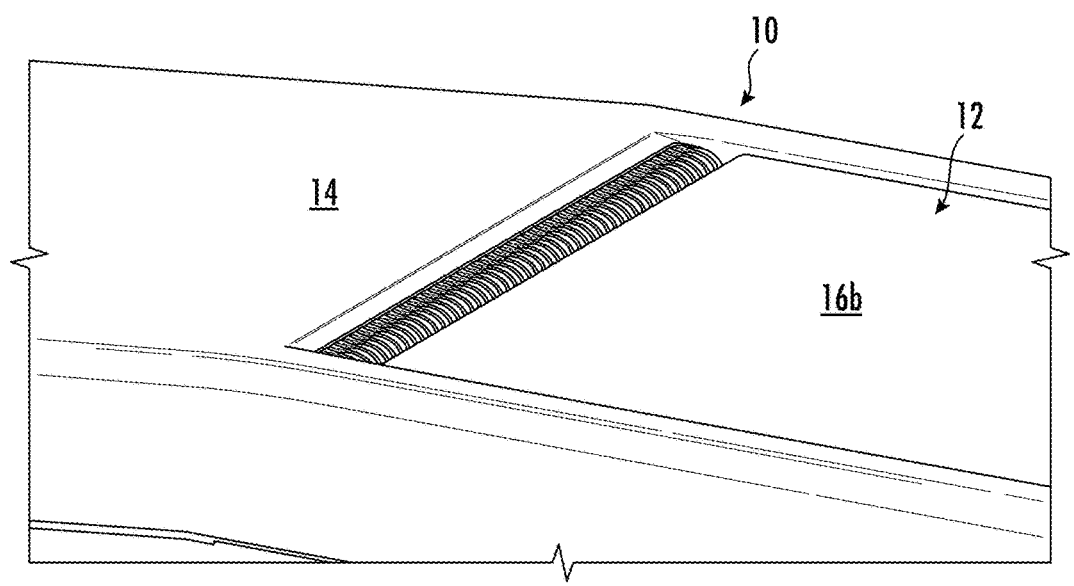
FIG. 2 is a perspective views of another type of conveyance system implementing a dynamic comb constructed in accordance with the present disclosure.
Figure 3:
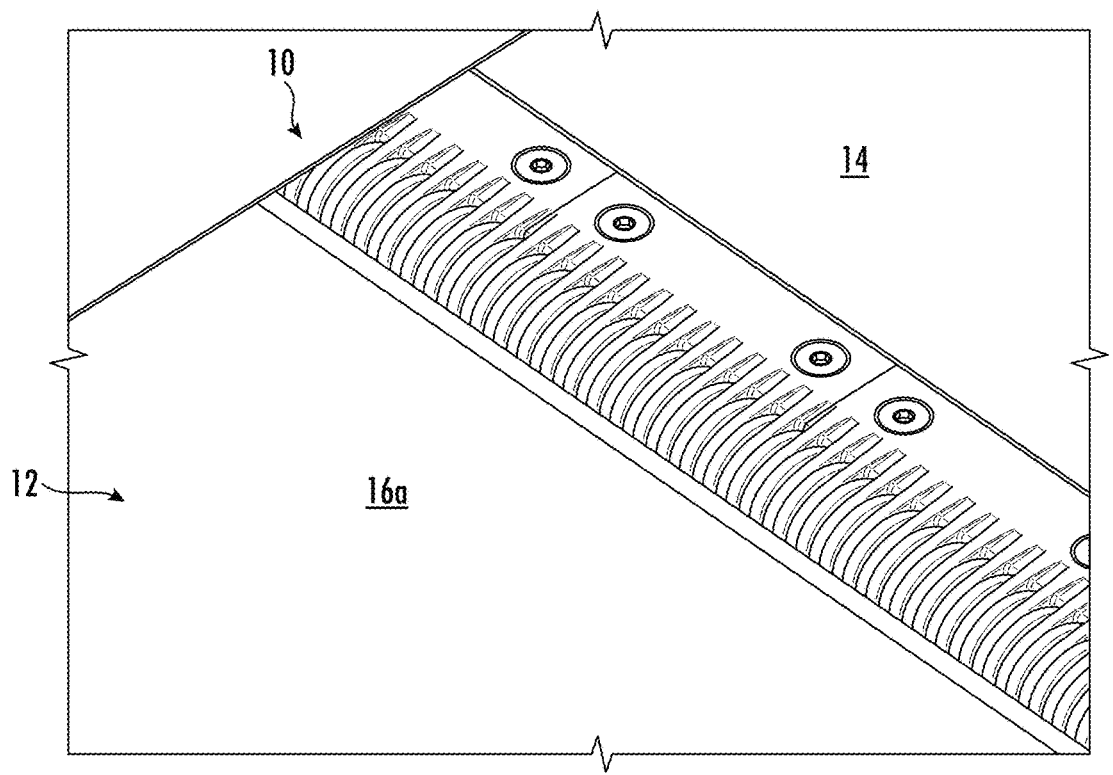
FIG. 3 is a close-up, perspective view of the dynamic comb in use with a conveyance system constructed in accordance with the present disclosure.
Figure 4A:
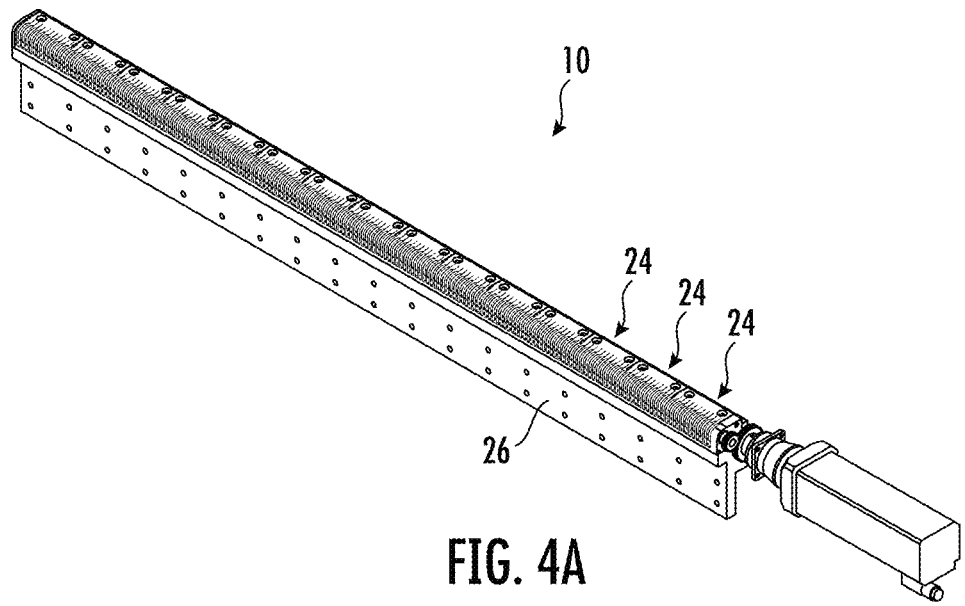
FIG. 4A is a perspective view of the dynamic comb constructed in accordance with the present disclosure.
Figure 4B:
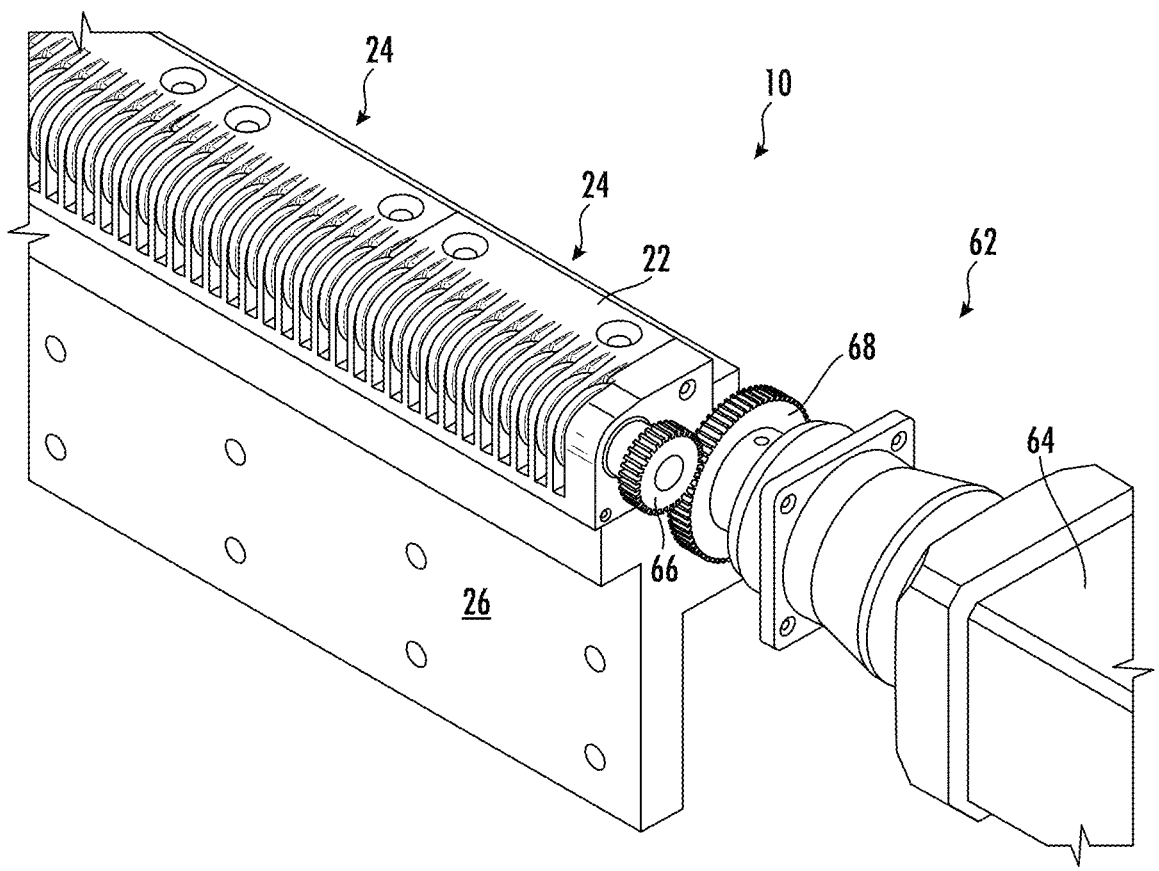
FIG. 4B is a close-up, perspective view of the dynamic comb shown in FIG. 4A constructed in accordance with the present disclosure.

Referring now to FIGS. 1-3, the present disclosure relates to a dynamic comb 10 for improving the transition between moving elements 12 and nonmoving elements 14 of a conveyance system 16, such as a moving walkway 16a, an escalator or a moving hand support system 16b used with a moving walkway or escalator. The conveyance system 16 could also be an apparatus used for moving objects. The moving elements 12 may be the belt of a moving walkway 16a or a moving hand support system 16b, or the steps of an escalator. The nonmoving elements 14 are the areas immediately adjacent to the dynamic combs 10 on the opposite side of the moving elements 12. The dynamic comb 10 can be placed at the beginning or end of a conveyance system 16. The improvements in the transition can include the prevention of objects, limbs of humans or pets, and/or other materials being entrapped between the moving and nonmoving elements 12 and 14 of the conveyance system 16 and easier transition of things, such as wheelchairs, between the moving and nonmoving elements 12 and 14 due to any height difference therebetween. The easier transition is accomplished by the dynamic comb 10 being more flushly mounted with the moving elements 12 of the conveyance system 16. In other words, the parts of the dynamic comb 10 can be lower (or not higher) than the moving elements 12 of the conveyance system 16, or the dynamic comb 10 is only slightly higher than the moving elements 12 of the conveyance system 16. The present disclosure is also directed to a method of operating or installing a conveyance system 16 that includes a dynamic comb 10 as described herein, or installing a dynamic comb 10 into a conveyance system 16.

Referring now to FIGS. 4A-6C, the dynamic comb 10 can include a roller element 18, a lower support element 20 and an upper support element 22. The dynamic comb 10 can be designed to work with the roller element 18 and only the lower support element 20, or it could be designed to work with the roller element 18 and only the upper support element 22. In one embodiment, the dynamic comb 10 can be made up of multiple comb sections 24 wherein each comb section 24 includes a roller element 18, a lower support element 20 and an upper support element 22. The use of multiple comb sections 24 allows for easy replacement of one of the sections 24 of the dynamic comb 10 if a particular comb section 24 gets damaged and the multiple sections can also prevent excessive deflection when the dynamic comb 10 is implemented for wider systems. The dynamic comb 10 can also include a base structure 26 that supports the lower support element 20, the upper support element 22 and the roller element 18. The lower support element 20 and the upper support element 22 are static structural components that support and protect the roller element 18 that rotates between the upper and lower support elements 20 and 22 and parts thereof. The roller elements 18 are set up to rotate in the same direction as the direction the moving elements 12 of the conveyance system 16 moves and at roughly the same speed as the moving elements 12 of the conveyance system 16. In certain scenarios, the roller elements 18 can be set up to rotate at a speed slower or faster than the speed of the adjacent moving element 12.

Figure 5A:
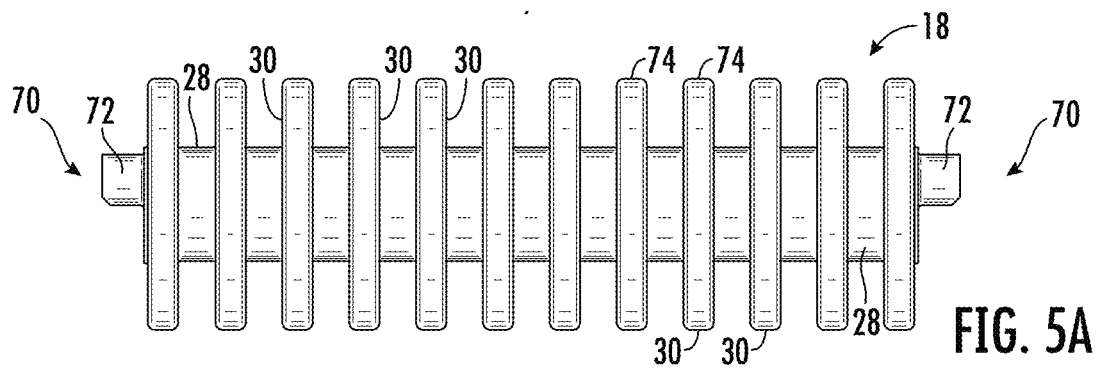
FIGS. 5A-5C provide multiple views of parts of the dynamic comb constructed in accordance with the present disclosure.

Each roller element 18, as shown in FIG. 5A, can include a shaft member 28 with a plurality of disc members 30 extending therefrom along the length of the shaft 28. The shaft 28 of the roller element 18 can be rotated, which rotates the disc elements 30 attached thereto. The space between each disc member 30 can be sized to accept various parts of the upper and lower support elements 20 and 22.

Figure 5B:
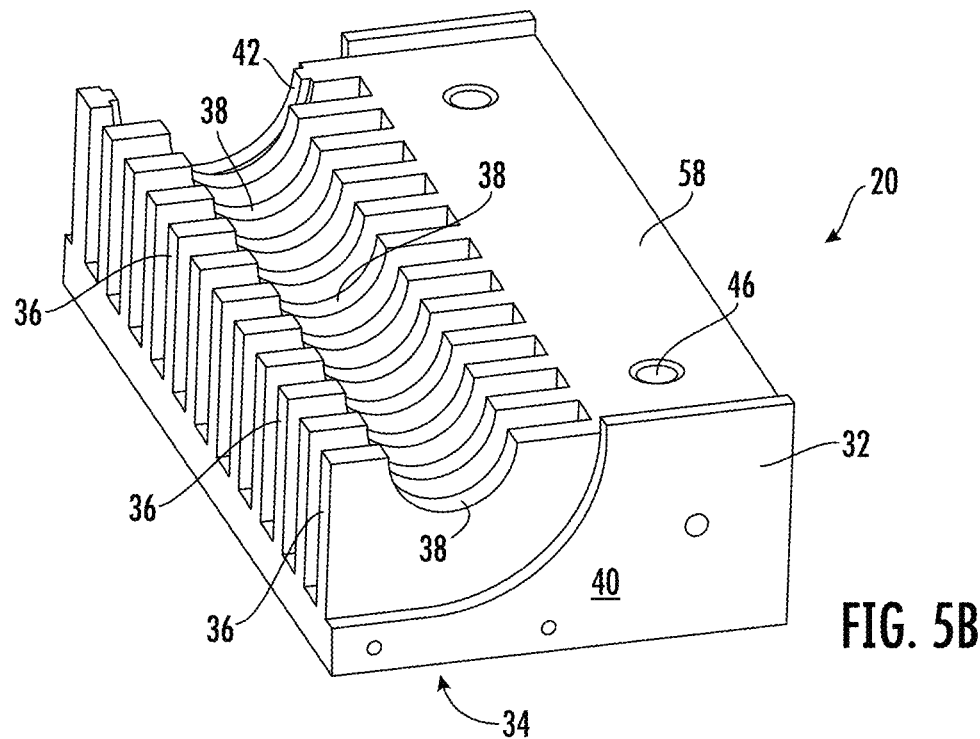

The lower support element 20, as shown in FIG. 5B, can have a base portion 32 that is supported by the base structure 26 on a bottom side 34 and a plurality of fin elements 36 extending from the base portion 32. The spaces between the fin elements 36 are sized such that the disc members 30 of the roller element 18 of the dynamic comb 10 can freely rotate therebetween, but not so big that there is space created where objects could become lodged in the spaces. Each fin element 36 of the lower support element 20 can include an arc-shaped cutout 38 to permit at least part of the shaft 28 of the roller element 18 to extend through the dynamic comb 10. The ends 40 of the lower support elements 20 can include a flange member 42 for supporting a bearing device 44 that engages with the shaft 28 of the roller element 18. The lower support 20 can also include a means for being secured to the upper support element 22. The two parts can be secured to one another via any manner known to one of ordinary skill in the art. In one exemplary embodiment, the lower support element 20 could have threaded openings 46 therein for accepting screws that extend through the upper support element 22 to secure the two parts together. The lower support element 20 can be secured to the base structure 26 of the dynamic comb 10 via any manner known in the art.

Figure 5C:
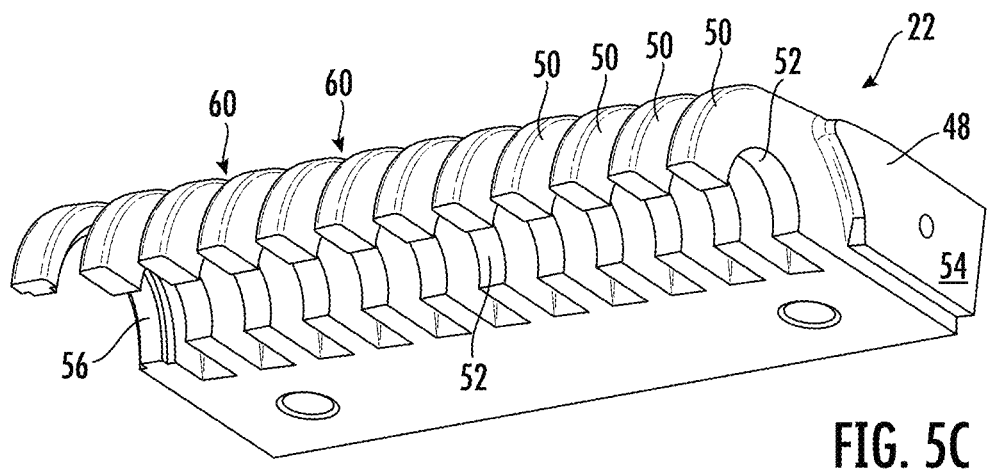
Figure 6A:
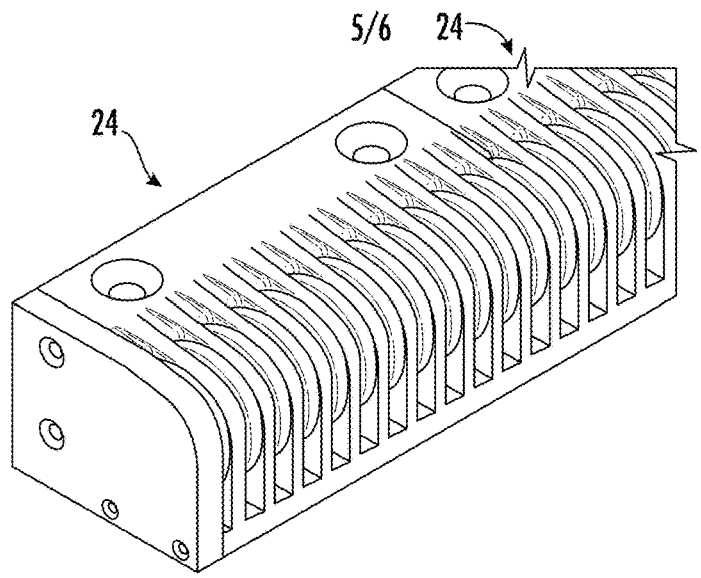
FIGS. 6A-6C are various views of certain aspects of the dynamic comb constructed in accordance with the present disclosure.
Figure 6B:
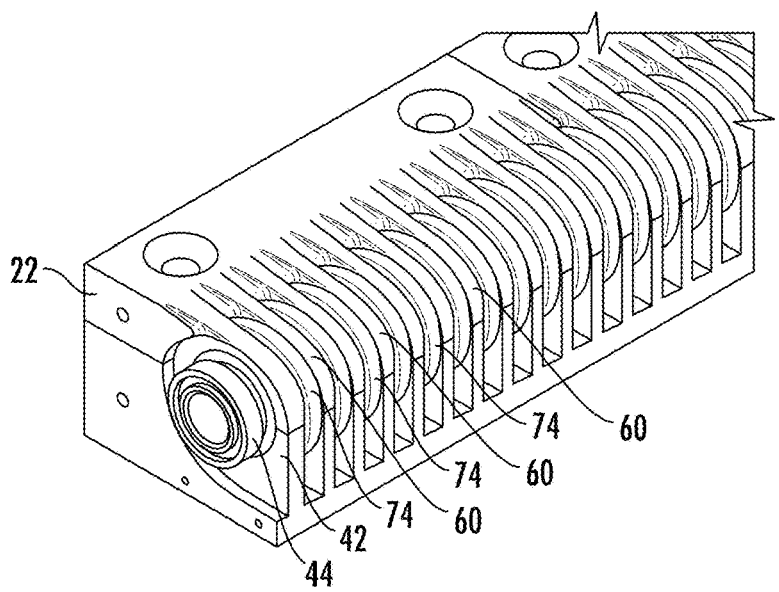
Figure 6C:
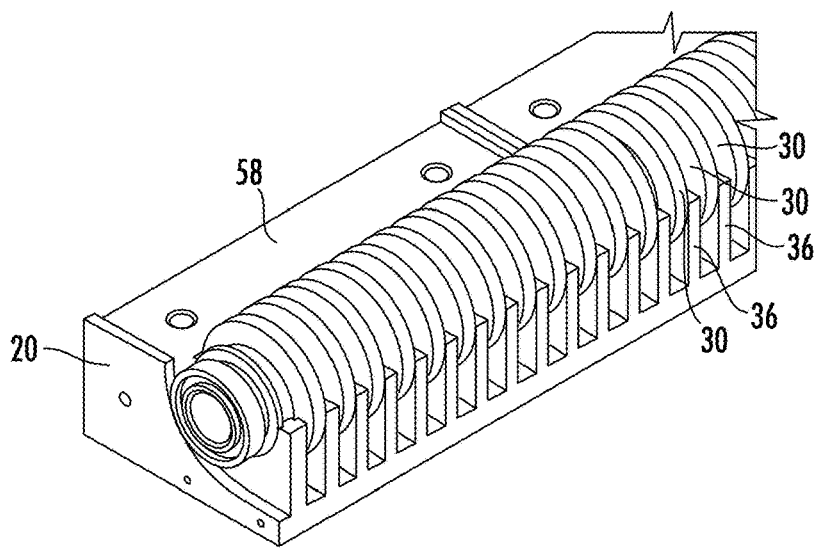

The upper support element 22, as shown in FIG. 5C, can have a body portion 48 having a plurality of fin elements 50 extending therefrom. Similar to the lower support element 20, the spaces between the fin elements 50 are sized such that the disc members 30 of the roller element 18 of the dynamic comb 10 can freely rotate therebetween, but not be so big that objects can become lodged in the spaces. Each fin element 50 of the upper support element 22 can include an arc-shaped cutout 52 to permit at least part of the shaft 28 of the roller element 18 to extend through the dynamic comb 10. The ends 54 of the upper support elements 22 can include a flange member 56 for working with the flange 42 of the lower support member 20 to support the bearing device 44 that engages with the shaft 28 of the roller element 18. The body portion 48 of the upper support element 22 can be positioned on an upper side 58 of the base portion 32 of the lower support element 20. The top sides 60 of the fin elements 50 of the upper support element 22 are curved to facilitate the transition from between the moving and non-moving elements 12 and 14 of the conveyance system 16.

Figure 7:
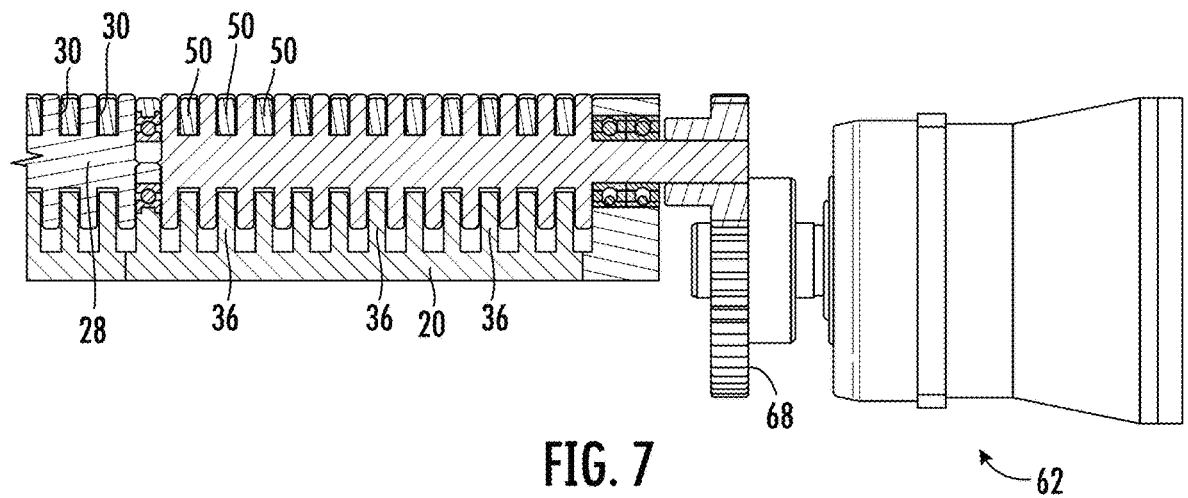
FIG. 7 is a partial side elevation view and partial cross-sectional view of a portion of the dynamic comb constructed in accordance with the present disclosure.

Referring now to FIG. 7, the dynamic comb 10 can also include a driving apparatus 62 for providing the rotation to the shaft 28 of the roller element 18 to rotate the shaft 28 and the disc members 30. The driving apparatus 62 can include a motor 64 that is dedicated to the dynamic comb 10, or it could be a motor that is used to drive other parts of the conveyance system 16. The shaft 28 of the roller element 18 could extend and engage directly with the motor 64. In another embodiment, the shaft 28 could include a gear 66 on one end that engages with a motor gear 68 operationally supported by the motor 64 wherein the motor 64 provides rotational movement to the motor gear 68. Additional gears and devices can be used to facilitate proper operation of the dynamic comb 10. In a further embodiment, the roller element 18 can be rotated by a pulley and belt-driven mechanism. The motor can have a gearbox or similar drive connection for the purposes of optimizing speed, torque, power efficiency, dimensional packaging, or another factor. The motor can be intelligently controlled by a computing device so that the speed of the roller element is very close to, or the same as, the speed of the moving elements 12 of the conveyance system 16.

Figure 8:
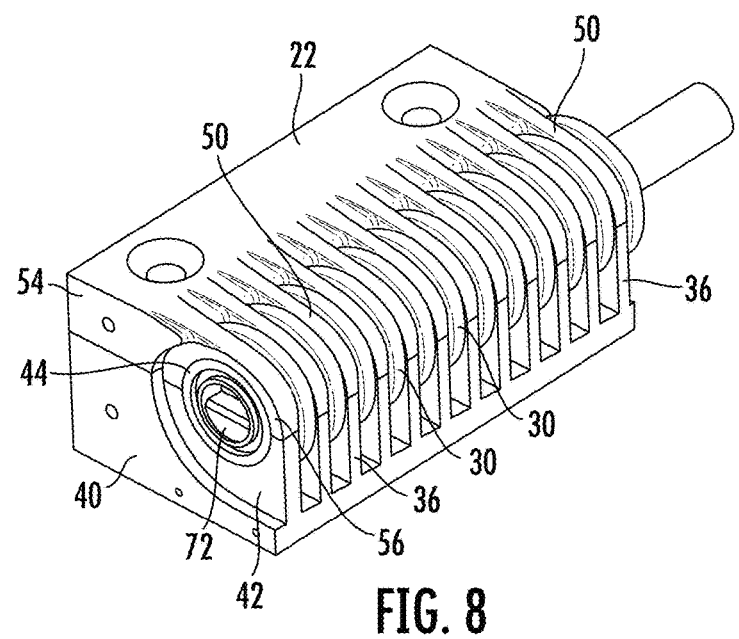
FIG. 8 is a perspective view of another part of the dynamic comb constructed in accordance with the present disclosure.

When the dynamic comb 10 incorporates multiple sections 24, the rotation of a primary roller element 18a has to be transferred to the other roller elements 18 of the dynamic comb 10. To transfer the rotation of one roller element 18 to another, the ends 70 of the roller elements 18 can include a power-transferring mating configuration, such as a spline or half circle. A half circle 72 on the end 70 of a roller 18 is shown in FIG. 8. The half circle 72 of one roller element 18 could engaged with another half circle 72 on the end 70 of an adjacent roller element 18 to transfer rotation. In another embodiment, one end of the roller element could include a protrusion and the end of the adjacent roller element could have a recessed part wherein the protrusion has a given cross-sectional shape that mates with a corresponding shape of the recessed part such that movement of one roller element forces movement of the adjacent roller element. For example, the cross-sectional shape of the protrusion can be star shaped, or the protrusion could have any polyagonal shape. The bearing devices 44 can be oriented such that the ends 70 of two shafts 28 of adjacent roller elements 18 can each extend at least partially into and be supported by the bearing device 44.

The disc members 30 of the roller element 18 can extend slightly beyond the fin elements 50 (more specifically the curved outer sides 60 of the fin elements 50) of the upper support element 22 so that the outer edge 74 of the disc members 30 is the closest part of the dynamic comb 10 to the moving elements 12 of the conveyance system 16. The distance between the disc members 30 and the moving elements 12 of the conveyance system 16 are minimized to help prevent objects from being able to get in between the dynamic comb 10 and the moving elements 12 of the conveyance system 16. The dynamic comb 10 is designed such that the width of the disc members 30 is greater than the width of the spaces between the disc members 30, and thus, the total width of the combined disc members' width is greater than the total width of the of the combined width of the spaces between the disc members 30. The greater width of the disc members 30 and the rotation of the disc members 30 contributes to the ejection of objects that might find their way in the area where the dynamic comb 10 is closest to the moving elements 12 of the conveyance system 16.

From the above description, it is clear that the present disclosure is well-adapted to carry out the objectives and to attain the advantages mentioned herein as well as those inherent in the disclosure. While presently preferred embodiments have been described herein, it will be understood that numerous changes may be made which will readily suggest themselves to those skilled in the art and which are accomplished within the spirit of the disclosure and claims.

What is claimed is:

1. A dynamic comb for use with a conveyance system to transition a passenger or object from a nonmoving element to a moving element and vice versa, the dynamic comb comprising:
   an upper support element;
   a roller element disposed at least partially between and below portions of the upper support element;
   wherein the dynamic comb includes multiple comb sections that cooperate to make up the dynamic comb, each comb section includes a separate roller element and upper support element, the movement of each roller element of each comb section is transferred to adjacent roller elements.

2. The dynamic comb of claim 1 wherein the roller element includes disc members extending from a shaft.

3. The dynamic comb of claim 2 wherein the upper support element includes first fin elements the disc members extend and rotate between.

4. The dynamic comb of claim 3 wherein the first fin elements include arc-shaped cutouts that permit the shaft of the roller element to extend through a portion of the upper support element.

5. The dynamic comb of claim 3 wherein outer edges of the disc members are about the same height as the height of top sides of the first fin elements.

6. The dynamic comb of claim 3 wherein outer edges of the disc members are disposed above the height of top sides of the first fin elements.

7. The dynamic comb of claim 1 further comprising a lower support element that cooperates with the upper support element to support the roller element.

8. The dynamic comb of claim 1 further comprising a driving apparatus to provide rotational movement to the roller element in a direction that matches the direction the moving element of the conveyance system travels.

9. A method, the method comprising:
   installing a dynamic comb for an existing conveyance system or as part of a new conveyance system to transition a passenger or object from a nonmoving element to a nonmoving element and vice versa, the dynamic comb comprising:
   an upper support element;
   a roller element disposed at least partially between and below portions of the upper support element;
   wherein the dynamic comb includes multiple comb sections that cooperate to make up the dynamic comb, each comb section includes a separate roller element and upper support element, the movement of each roller element of each comb section is transferred to adjacent roller elements.

10. The method of claim 9 wherein the roller element includes disc members extending from a shaft.

11. The method of claim 10 wherein the upper support element includes first fin elements the disc members extend and rotate between.

12. The method of claim 11 wherein the first fin elements include arc-shaped cutouts that permit the shaft of the roller element to extend through a portion of the upper support element.

13. The method of claim 11 wherein outer edges of the disc members are about the same height as the height of top sides of the first fin elements.

14. The method of claim 11 wherein outer edges of the disc members are disposed above the height of top sides of the first fin elements.

15. The method of claim 9 further comprising a driving apparatus to provide rotational movement to the roller element in a direction that matches the direction the moving element of the conveyance system travels.

16. A dynamic comb for use with a conveyance system to transition a passenger or object from a nonmoving element to a moving element and vice versa, the dynamic comb comprising:
   a lower support element;
   a roller element disposed at least partially between and above portions of the lower support element;
   wherein the dynamic comb includes multiple comb sections that cooperate to make up the dynamic comb, each comb section includes a separate roller element and lower support element, the movement of each roller element of each comb section is transferred to adjacent roller elements.

17. The dynamic comb of claim 16 wherein the roller element includes disc members extending from a shaft.

18. The dynamic comb of claim 16 further comprising an upper support element that cooperates with the lower support element to support the roller element.

19. The dynamic comb of claim 18 wherein the upper support element includes first fin elements the disc members extend and rotate between.

20. The dynamic comb of claim 19 wherein outer edges of the disc members are about the same height as the height of top sides of the first fin elements or disposed above the height of top sides of the first fin elements.

21. The dynamic comb of claim 19 wherein the first fin elements include arc-shaped cutouts that permit the shaft of the roller element to extend through a portion of the upper support element.

* * * * *